United States Patent [19]

Johnson et al.

[11] Patent Number: 5,815,573
[45] Date of Patent: Sep. 29, 1998

[54] CRYPTOGRAPHIC KEY RECOVERY SYSTEM

[75] Inventors: Donald Byron Johnson, Pleasant Valley, N.Y.; Paul Ashley Karger, Acton; Charles William Kaufman, Jr., Northborough, both of Mass.; Stephen Michael Matyas, Jr., Poughkeepsie, N.Y.; Marcel Mordechay Yung, New York, N.Y.; Nevenko Zunic, Wappingers Falls, N.Y.

[73] Assignee: International Business Machines Corporation, Armonk, N.Y.

[21] Appl. No.: 629,815

[22] Filed: Apr. 10, 1996

[51] Int. Cl.[6] ............................ H04K 1/00
[52] U.S. Cl. .............................. 380/21; 380/30
[58] Field of Search ................. 380/30, 28, 23, 380/4

[56] References Cited

U.S. PATENT DOCUMENTS

| | | |
|---|---|---|
| 5,276,737 | 1/1994 | Micali . |
| 5,315,658 | 5/1994 | Micali . |
| 5,436,972 | 7/1995 | Fischer .......................... 380/30 |
| 5,553,145 | 9/1996 | Micali .......................... 380/30 |
| 5,557,346 | 9/1996 | Lipner et al. .................. 380/30 |
| 5,625,695 | 4/1997 | M'Raihi et al. ................ 380/30 |
| 5,629,982 | 5/1997 | Micali .......................... 380/30 |
| 5,647,000 | 7/1997 | Leighton ....................... 380/30 |

FOREIGN PATENT DOCUMENTS

| | | |
|---|---|---|
| 9519672 | 7/1995 | WIPO . |
| 8605673 | 2/1996 | WIPO . |

OTHER PUBLICATIONS

Prepared Remarks of Ray Ozzie, President of Iris Associates, Delivered Today at the RSA Data Security Conference, San Francisco, Jan. 17, 1996.

Lotus Press Release, Lotus is Shipping More Secure International Edition of Notes Release 4, Ozzie Outlines New Feature at RSA Data Security Conference, San Francisco, Jan. 17, 1996.

"System Descryption and Background Rational Version 2.0", Commercial Key Escrow (CKE).

"TIS Announces Encryption Key Recovery Technology.", RSA Data Security Conference, San Francisco, Jan. 18, 1996, Trusted Information Systems, Inc.

"TIS Gauntlet Firewall With 56–Bit Des Approved for U. S. Export", RSA Data Security Conference, San Francisco, Jan. 18, 1996, Trusted Information Systems, Inc.

"Data Recovery Centers", Trusted Information Systems, Inc., 1996.

(List continued on next page.)

*Primary Examiner*—David C. Cain
*Attorney, Agent, or Firm*—W. A. Kinnaman, Jr.

[57] ABSTRACT

A cryptographic key recovery system for generating a cryptographic key for use by a pair of communicating parties while simultaneously providing for its recovery using one or more key recover agents. A plurality of m-bit shared key parts (P, Q) are generated which are shared with respective key recovery agents, while an n-bit nonshared key part (R) is generated that is not shared with any key recovery agent. The shared key parts (P, Q) are combined to generate an m-bit value which is concatenated with the nonshared key part (R) to generate an (m+n)-bit value from which an encryption key is generated. The cryptographic system has the effective work factor of an n-bit key to all of the key recovery agents acting in concert, but has the effective work factor of an (m+n)-bit to any other combination of third parties. The quantity n is selected to make authorized key recovery feasible, but not so trivial as to permit routine decryption of intercepted communications, while the quantity m is selected to make decryption by unauthorized third parties infeasible. Means are provided for verifying that the shared key parts have been shared with the key recovery agents before permitting encrypted communications using the thus generated key.

27 Claims, 8 Drawing Sheets

U.S. PATENT DOCUMENTS

"The Path to Global Information Security", Commercial Key Escrow Datasheet, Trusted Information Systems, Inc.

Bellare, Mihir et al., "Encapsulated Key Escrow", MIT Laboratory for Computer Science Technical Report 688, Apr. 1996.

Bellare, Mihir et al., "Verifiable Partial Key Escrow", MIT Laboratory for Computer Science, Oct. 1995.

Beth, Thomas et al., "Towards Acceptable Key Escrow Systems", Association of Computing Machinery, 1994, pp. 51–58.

Blaze, M., "Key Management in an Encrypting File System", 1994 Proceedings of the Summer 1994 USENIX Conference, Jun. 6–10, 1994, Boston, MA, pp. 27–35.

Denning, Dorothy E. et al., "A Taxonomy for Key Escrow Encryption Systems", Communications of the ACM, Mar. 1996, vol. 39, No. 3, 17, pp. 34–40.

Denning, Dorothy E., "Descriptions of Key Escrow Systems" Version of Jan. 21, 1996.

Denning, Dorothy E. et al., "Key Escrowing Today", IEEE Communications Magazine, vol. 32, No. 9, Sep. 1994, pp. 58–68.

Desmedt, Yvo, "Securing Traceability of Ciphertexts: Towards a Secure Software Key Escrow System", Advances in Cryptology–EUROCRYPT '95, Int'l. Conf. on the Theory and Application of Cryptographic Techniques, Saint–Malo, France, May 21–25, 1995, pp. 146–157.

Frankel, Yair et al., "Escrow Encryption Systems Visited: Attacks, Analysis and Designs", Advances in Cryptology– CRYPTO '95, 15th Annual Int'l. Cryptology Conf., Proceedings 1995, pp. 222–235.

Ganesan, Ravi, Guest Editor, "How to Use Key Escrow", Communications of the ACM, Mar. 1996, vol. 39, No. 3, p. 33.

Ganesan, Ravi, "The Yaksha Security System", Communications of the ACM, Mar. 1996, vol. 39, No. 3, pp. 55–60.

Johnson Don B. et al., "Enhanced Optimal Asymmetric Encryption: Reverse Signatures and ANSI X9.44", IBM Cryptography Center of Competence, Poughkeepsie, NY, Jan. 18, 1996, pp. 1–8.

Kilian, Joe et al., "Fair Cryptosystems, Revisited", Advances in Cryptology–CRYPTO '95, 15th Annual Int'l. Cryptology Conf., Proceedings 1995, pp. 208–221.

Lenestra, Arjen K. et al., "A Key Escrow System with Warrant Bounds", Advances in Cryptology–CRYPTO '95, 15th Annual Int'l. Cryptology Conf., Proceedings 1995, pp. 197–207.

Maher, David P., "Crypto Backup and Key Escrow", Communications of the ACM, Mar. 1996, vol. 39, No. 3, pp. 48–53.

Micali, Silvio et al., "A Simple Method for Generating and Sharing Pseudo–Random Functions, with Applications to Clipper–like Key Escrow Systems", Advances in Cryptology– CRYPTO '95, 15th Annual Int'l. Cryptology Conf., Proceedings 1995, pp. 185–196.

Micali, Silvio, "Fair Public–Key Cryptosystems", Laboratory for Computer Science, Massachusetts Institute of Technology, Cambridge, MA.

Scheidt, Edward M., "Private Escrow Key Management: A Method and Its Issues", Proc. SPIE—Int. Soc. Opt. Eng., vol. 2616, 1996, pp. 14–17.

Shamir, Adi, "Partial Key Escrow: A New Approach to Software Key Escrow", Notes from the Key Escrow Conference, Washington DC, Sep. 15, 1995.

Walker, Stephen T. et al., "Commercial Key Recovery", Communications of the ACM, Mar. 1996, vol. 39, No. 3, pp. 41–47.

"Building a World of Trust Key Recovery Technology", Trusted Information Systems, Inc.

Caelli, W.J., "Commercial Key Escrow: An Australian Perspective", Cryptography: Policy and Algorithms. Int'l. Conf. Proceedings Brisbane, Qld., Australia 3–5, Jul. 1995, pp. 41–64.

Kaliski, B., "A Survey of Encryption Standards", IEEE Micro, vol. 13, No. 6, Dec. 1993, pp. 74–81.

Denning, D.E., "Key Escrow Encryption: The Third Paradigm", Computer Security Journal, vol. 11, No. 1, 1995, pp. 43–52.

| COUNTRY | ENCRYPT ALGORITHM | MAXIMUM ALLOWED KEY LENGTH (BITS) | | | PUBLIC KEYS | | | |
|---|---|---|---|---|---|---|---|---|
| | | WITHOUT PQR INTRA-COUNTRY | WITH PQR INTER-COUNTRY | | KEY RECOVERY AGENT 1 | KEY RECOVERY AGENT 2 | ... | KEY RECOVERY AGENT n |
| | | | $R = r_1$ XOR $r_2$ | ENTIRE KEY | | | | |
| X | DES | INF. | 40 | 64 | 1FCD38... | 74901A... | ... | 30FA67... |
| | RC5 | INF. | 40 | 64 | 1FCD38... | 74901A... | | 30FA67... |
| Y | DES | 128 | 40 | 128 | E52AC3... | F32AB7... | | 5EF200... |
| | RC5 | 128 | 40 | 128 | E52AC3... | F32AB7... | | 5EF200... |
| Z | DES | 64 | 64 | 128 | 6494FF... | 66673E... | ... | 342781... |
| | RC5 | 64 | 64 | 128 | 6494FF... | 66673E... | | 342781... |
| W | DES | 00 | 00 | 128 | AF88C2... | CBE8F9... | | 1BF87C... |
| | RC5 | 00 | 00 | 128 | AF88C2... | CBE8F9... | | 1BF87C... |
| ... | ... | ... | ... | ... | ... | ... | | ... |

CRYPTOGRAPHIC KEY RECOVERY SYSTEM

BACKGROUND OF THE INVENTION

1. Field of the Invention

This invention relates to a cryptographic key recovery system and, more particularly, to a method and apparatus for generating a cryptographic key for use by a pair of communicating parties while simultaneously providing for its recovery using one or more key recover agents.

2. Description of the Related Art

Data encryption systems are well known in the data processing art. In general, such systems operate by performing an encryption operation on a plaintext input block, using an encryption key, to produce a ciphertext output block. The receiver of an encrypted message performs a corresponding decryption operation, using a decryption key, to recover the plaintext block.

Encryption systems fall into two general categories. Symmetric (or private key) encryption systems such as the Data Encryption Standard (DES) system use the same secret key for both encrypting and decrypting messages. In the DES system, a key having 56 independently specifiable bits is used to convert 64-bit plaintext blocks to ciphertext blocks, or vice versa.

Asymmetric (or public key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, however, since only he has the private key. Perhaps the best-known asymmetric encryption system is the RSA encryption system, named after its originators Rivest, Shamir and Adleman.

Asymmetric encryption systems are generally more computationally intensive than symmetric encryption systems, but have the advantage that they do not require a secure channel for the transmission of encryption keys. For this reason, asymmetric encryption systems are often used for the one-time transport of highly sensitive data such as symmetric encryption keys.

Data encryption systems of all types have attracted the attention of government intelligence agencies and law enforcement agencies, since the same cryptographic strength that prevents decryption by unauthorized third parties also prevents decryption by intelligence or law enforcement officials having a legitimate reason for wanting to access the plaintext data. Because of such concerns, governments have either prohibited the use or export of strong encryption systems or have conditioned their approval on the use of weakened keys that are susceptible to key-exhaustion attacks (i.e., systematically testing all possible keys until the right one is found). Such weak encryption systems have the obvious disadvantage that they are just as vulnerable to unauthorized third parties as they are to authorized government officials.

One solution to this dilemma is the use of a so-called key recovery system, in which an encryption key is shared with a key recovery agent. The key recovery agent will reveal the key to a government requester upon the presentation of sufficient credentials (such as a court order), but will otherwise keep the key secret. Key recovery systems have the advantage that they address the legitimate concerns of intelligence and law enforcement agencies while at the same time permitting the use of encryption systems that strongly resist attacks by unauthorized third parties. Several such systems are described in D. E. Denning and D. K. Branstad, "A Taxonomy for Key Escrow Encryption Systems", *Communications of the ACM*, vol. 39, no. 3, Mar. 1996, pp. 34–40, incorporated herein by reference.

One recently developed key recovery system is the system described in the copending application of C. W. Kaufman and R. E. Ozzie, Ser. No. 08/573,228, filed Dec. 15, 1995, entitled "DIFFERENTIAL WORK FACTOR METHOD AND SYSTEM", as well as in the similarly entitled, concurrently filed copending application of C. W. Kaufman and S. M. Matyas, Ser. No. 08/573,110, both of which applications are incorporated herein by reference.

The Kaufman et al. applications disclose a system in which only part of a cryptographic key is disclosed to a key recovery agent in each of one or more countries. Thus, as disclosed in these applications, a portion of a cryptographic key is provided to a key recovery agent so that an entity having access to the key portion (as pursuant to a court order) only has to ascertain the remaining key bits rather than the entire cryptographic key. The size of the key portion provided to the key recovery agent is such that the work factor involved in recovering the remaining key portion is reduced to a feasible level, though not entirely eliminated. The work factor for unauthorized third parties remains the same, however, hence the notion of a "differential work factor".

Although the system described in the copending Kaufman et al. applications addresses many of the shortcomings of previous key recovery systems, there remains the problem of a corrupt or compromised key recovery agent. Access to the partial key information provided to the key recovery agent will permit the discovery of the entire cryptographic key (although with some difficulty). This security exposure is a matter of concern to some users of cryptosystems, who might hesitate to entrust such critical key information to a key recovery agent over whom they have no control.

OBJECTS OF THE INVENTION

One object of the present invention is to provide a key recovery system that accommodates the competing demands of several different entities, including governments, corporate customers, hardware and software providers, law enforcement agencies and private individuals.

Another object of the present invention is to provide a key recovery system that can be implemented in software or hardware.

Another object of the present invention is to provide a key recovery system that does not require communication with a third party during message creation or connection setup.

Another object of the present invention is to provide a key recovery system that provides interoperability between users in different countries, even if it requires providing keys to multiple authorities simultaneously.

Another object of the present invention is to provide a key recovery system that uses publicly known algorithms.

Another object of the present invention is to provide a key recovery system whose design is open and can be implemented by multiple vendors based on published specifications.

Another object of the present invention is to provide a key recovery system that provides a key recovery capability independently for each country.

Another object of the present invention is to provide a key recovery system that provides, in a single system, the flexibility for different levels of security in different environments.

Another object of the present invention is to provide a key recovery system that provides the highest level of cryptographic security allowable by law.

Another object of the present invention is to provide a key recovery system that guards against a single point of attack (e.g., a corrupt key recovery agent).

Another object of the present invention is to provide a key recovery system that supports all forms of electronic communication.

Another object of the present invention is to provide a key recovery system that provides a scalable solution.

Another object of the present invention is to provide a key recovery system that supports both store-and-forward and interactive environments.

Another object of the present invention is to provide a key recovery system that does not require communication with a third party for installation (i.e., it works "out of the box").

Another object of the present invention is to provide a key recovery system that supports the policy option of requiring the collaboration of multiple key recovery agents to recover the key.

Another object of the present invention is to provide a key recovery system that allows an external verifier (without access to the key recovery keys) to have some level of confidence that the key recovery values are in compliance with an unpatched implementation of the invention.

Another object of the present invention is to provide a key recovery system in which a patched implementation that avoids sending the key recovery values cannot interoperate with an unpatched implementation which needs to validate them.

SUMMARY OF THE INVENTION

The present invention is based upon the "differential work factor" system described in the Kaufman et al. applications referred to above. The present invention contemplates providing one or more key parts to key recovery agents within the host countries consistent with the laws and regulations of the country where communication is taking place. The user may still retain a portion of the key which is unknown to any key recovery agent. This feature should satisfy users who may otherwise be reluctant to use a key recovery system.

A simple example will help explain the invention. The example will demonstrate how, for instance, one can achieve triple-DES protection against unauthorized third parties while presenting the government with only a single-DES work factor. Assume that a party in country X wishes to communicate with a party in country Y with a 168-bit key. To accomplish this, the two parties use a 280-bit value (PQR) which they randomly generate. The first two 112-bit portions (P and Q) are exclusive-ORed to generate one 112-bit value, which is appended to the remaining 56-bit portion (R) to generate a 168-bit resultant value. The 56-bit R value is never divulged to anyone. A one-way hash function is then used on the 168-bit resultant value to derive the session key (or any other key used by the parties).

The value P is encrypted with the public key of one key recovery agent in each country, and the value Q is encrypted with the public key of a second key recovery agent in each country. Therefore, if one key recovery agent was corrupt and revealed the value P, it would not pose a problem since the value of Q is still unknown to an attacker. Not knowing the value of Q, nor the value of R, the attacker would still be required to break a 168-bit key in order to decipher the communication. Users should find this solution to be more palatable than an system where the entire key is known to one or more key recovery agents. When the two companies communicate, the encrypted values of P and Q would precede the encrypted file. This solution assumes that electronic messages can be intercepted.

In the above example, a 168-bit key was used for illustration purposes. In general, however, the values of P and Q on the one hand and R on the other are independently variable and could be tailored for each country.

In its preferred form, the present invention offers much flexibility. For example, the invention is adaptable and amenable to each country's laws and regulations. There is built-in flexibility for the lengths of shared (P, Q) and non-shared (R) key portions. For communications between two countries, the key recovery rules could default to the lower limit on the length of R, resulting in the lower work factor. The key management can be done in a variety of ways that are consistent with today's standard industry practices.

Law enforcement agencies can always be sure that the key recovery agent gives them the correct information. They merely need to encrypt the information and compare it for equality with the intercepted encrypted block. This enables government to identify a potentially "bad" key recovery agent.

Keys are "made available" at the session level. This provides compartmentalization and appropriate access to encrypted data via an authorized court order. Sharing the private keys of a public key algorithm with a key recovery agent is a bad idea, since it gives access to encrypted messages received from others instead of messages sent to others. It also forces these keys to roll-over frequently in order to enforce appropriate compartmentalization. See Y. Frankel and M. Yung, "Escrow Encryption Systems Visited: Attacks, Analysis and Designs". *Crypto '95 Conference Proceedings*, August 1995, for more information on this topic.

The present invention provides a commercially acceptable solution to governments' needs for authorized access to encrypted data. It can also be used for commercial key recovery.

In this specification, the term "recovery" is used loosely to mean "made available." A secret value can be made available in different ways. It may be encrypted and made available to a third party or it may be encrypted and transmitted with the encrypted data, in which case it must be accessed via electronic means. The examples in this specification describe the latter approach.

The present invention contemplates sending a session context which contains enough information to: (1) allow the recipient to derive the key; (2) allow the recipient to verify the associated key recovery information; and (3) allow authorized entities the ability to recover components of the key.

The "differential work factor" may be set as part of a government or organization policy decision. That is, a government or organization may allow a user to retain a portion of the key which is unknown to any key recovery agent. This feature should help satisfy users who may otherwise feel reluctant about using a key recovery system.

The present invention addresses the communication needs of users and authorized key recovery agents located in different countries. It is applicable to a wide variety of cryptographic algorithms and key lengths. However, for the purpose of this specification, we will use an example of triple DES with a total key length of 168 bits.

The present invention assumes the use of public key cryptography in operating with the key recovery agents. The invention does not assume the use of public key cryptography for key distribution between users. Although the examples of key distribution in this specification use only public key cryptography, one could just a well use a symmetric key system such as the Kerberos system, albeit with some modification of the software.

The present invention assumes that the public keys of users and key recovery agents are certified. The procedures and mechanisms to achieve this are well known in the art and are not part of the present invention.

It is assumed that each country may employ multiple key recovery agents. Each key recovery agent creates its own public and private key pair (e.g., RSA keys of 1024 bits). The cryptographic equipment used should be capable of handling variable key sizes. Each key recovery agent keeps the private key secret and publishes the public key.

Preferably, the key recovery agents' public keys, their certifiers' public keys, or secure means for obtaining these public keys are provided in the client hardware or software. This allows an encryption product to ship with a capability to operate as a turn-key solution "out of the box." A system conforming to the key recovery system of the present invention is preferably pre-configured with a country ID indicating the country in which the system is located and will operate. A user might also be able to configure the system with other information required by the key recovery protocol.

In a cryptographic product that has only a key recovery capability, the present invention prevents application programs from circumventing the key recovery system by directly invoking the encryption algorithm. Once invoked, the key recovery system ensures that the key recovery protocol steps are followed. That is, a key used for data privacy encryption will not be made available to the application program or user until after the protocol steps have been successfully completed.

Due care should be taken in replacing public keys due to roll-over.

The present invention does not attempt to address the ability of two patched implementations to interoperate. Two users are always able to "do their own thing" outside of the present invention. Nor does the present invention address the problem of lost or forgotten keys. That problem, if real, must be addressed by other mechanisms.

The present invention may be implemented as special-purpose hardware, as software executing on a general-purpose digital computer, or some combination of the two. By "software" is meant a program storage device—such as a direct access storage device (DASD) or read-only memory (ROM)—readable by a machine and tangibly embodying a program of instructions executable by the machine to perform method steps as described herein.

DESCRIPTION OF THE PREFERRED EMBODIMENTS

Figure 1:
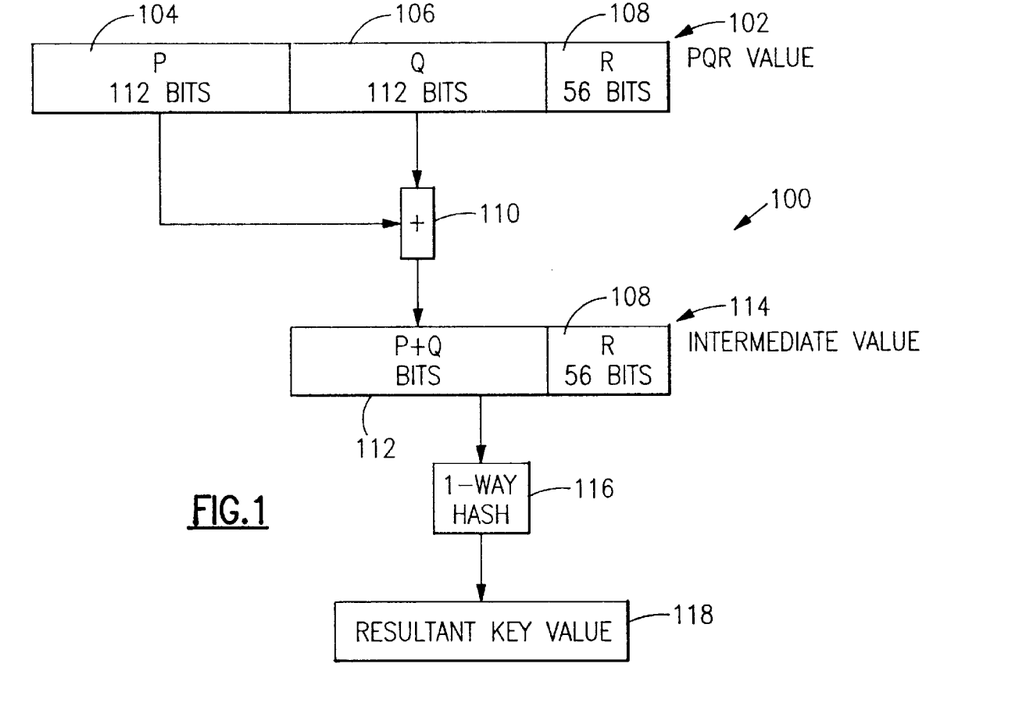
FIG. 1 is a schematic block diagram showing the basic procedure of the present invention for generating an encryption key from P, Q and R values.
Figure 1A:
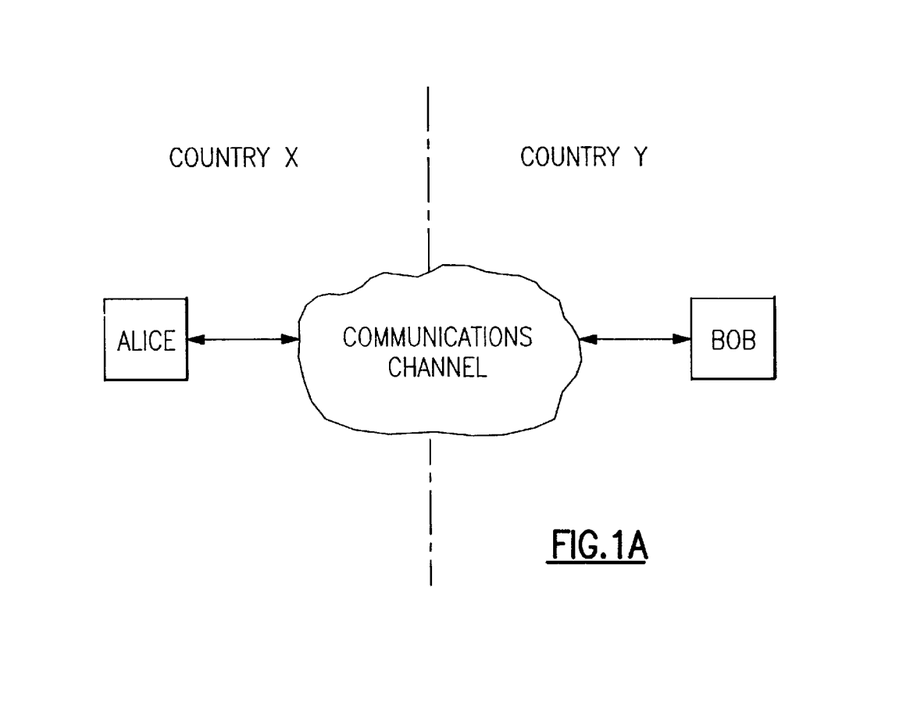
FIG. 1A is a schematic block diagram of the basic communications system contemplated by the present invention.

FIG. 1 shows a simplified version 100 of the procedure of the present invention for generating an encryption key for a pair of users who are located in different countries and wish to communicate privately. In accordance with the usual convention, these parties are referred to herein as Alice and Bob. Referring to FIG. 1A, it is assumed that Alice is located in country X and Bob is located in country Y, and that the two systems are coupled via a communications channel. (References herein to "Alice" and "Bob" are to their systems unless the context clearly dictates otherwise.)

Although the example has only two users (Alice and Bob), the communication could be among more than two users. Also, although countries X and Y are shown in the example, the invention could also be used entirely within one country (and one set of key recovery agents).

To communicate with each other, Alice and Bob first agree upon a randomly generated secret value 102 referred to herein (for reasons that will become evident) as the PQR value. PQR value 102 comprises an m-bit P value 104, an m-bit Q value 106 and an n-bit R value 108. In the example shown in FIG. 1, m is 112 and n is 56, although other values of m and n could be used instead.

The P value 104 is shared with a first key recovery agent in each country, while the Q value 106 is shared with a second key recovery agent in each country, in a manner to be described. The R value 108 is kept as a shared secret between users Alice and Bob and not revealed to any other entity. The R value 108 constitutes that portion of the PQR value 102 which authorized parties (such as intelligence agencies and law enforcement agencies) must ascertain using available cryptanalytic means, even after obtaining the P and Q values 104 and 106 from the key recovery agents. The length of the R value 108 thus determines the strength of the encryption procedure against the key recovery agents of a particular country acting in concert. In the example, the sizes of P, Q, and R are identical for countries X and Y.

To generate an encryption key, the P and Q values 104 and 106 are exclusive-ORed (XORed) with each other—i.e., combined by bitwise modulo 2 addition (110)—to produce a 112-bit resultant value 112:

$$P \; XOR \; Q$$

Although the XOR operation is used in the example, other combining operations could be used instead.

The resultant value 112 is then concatenated with the R value 108 to produce a 168-bit intermediate value 114:

$$(P \; XOR \; Q) \; \| R.$$

(Unless the context clearly dictates otherwise, "concatenation" as used herein includes interleaving of bits.)

The intermediate value 114 is then hashed (116) one or more times (altering inputs slightly in a predictable way) and the resultant key value 118 extracted from the generated hash values. For example, a 56-bit key value 118 could be extracted for single-DES encryption, or three 56-bit key values could be extracted for triple-DES encryption.

Figure 2A:
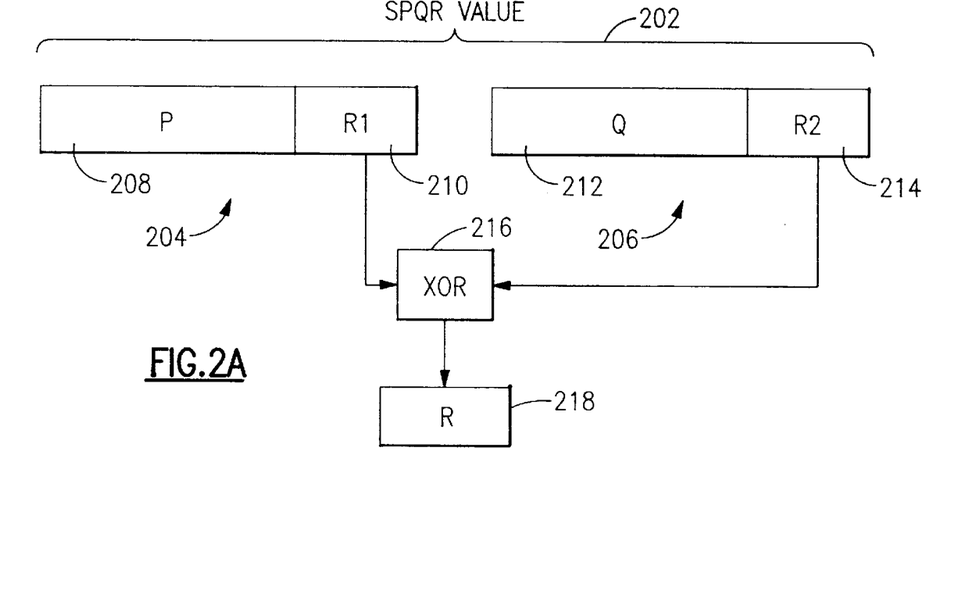
FIG. 2A is a schematic block diagram of a modification of the procedure of FIG. 1 in which the length of the R value may be varied on a per country basis.

In the example shown in FIG. 1, the PQR value 102 is identically partitioned into P, Q and R values 104–108 for each of the countries X and Y. In general, however, the partitioning may vary by country, as shown in FIG. 2.

Referring to FIG. 2, in this latter example Alice generates a secret starting PQR (SPQR) value 202. SPQR value contains (2m+2n) bits, or 336 bits if (as assumed for this example) m is 112 and n is 56. SPQR value 202 consists of two parts of equal length: a 168-bit left half 204 and a 168-bit right half 206. (In general, the partitioning of SPQR into halves may be performed in an arbitrarily manner, such as selecting even bits for one half and odd bits for the other.) The left half 204 is subdivided to produce a P part 208 and r1 part 210, while the right half 206 is subdivided to produce a Q part 212 and r2 part 214. (In a similar manner, the partitioning of the parts 204 and 206 into subparts may be done on an arbitrary basis.) An R value 218 is obtained by generating (216) the exclusive-OR (XOR) product of r1 and r2:

$$R = r1 \; XOR \; r2$$

The P and Q parts 208 and 212 are made available to authorized key recovery agents; the r1 and r2 parts 210 and 214 and the derived R value 218 are retained by the users.

The manner in which the R value 218 is generated in this example allows the lengths of P, Q and R to vary from one country to another. Thus, the lengths of r1, r2 and R may be zero, in which case P consists of the entire 168-bit left half 204 of SPQR 202 and Q consists of the entire 168-bit right half 206. On the other hand, the lengths of P and Q may be zero, in which case r1 consists of the entire 168-bit left half 204 of SPQR and r2 consists of the entire 168-bit rightmost part 206. More generally, R may vary in length between 0 and the length of halves 204 and 206 (168 bits in this example), depending on the country requirements.

Figure 8:
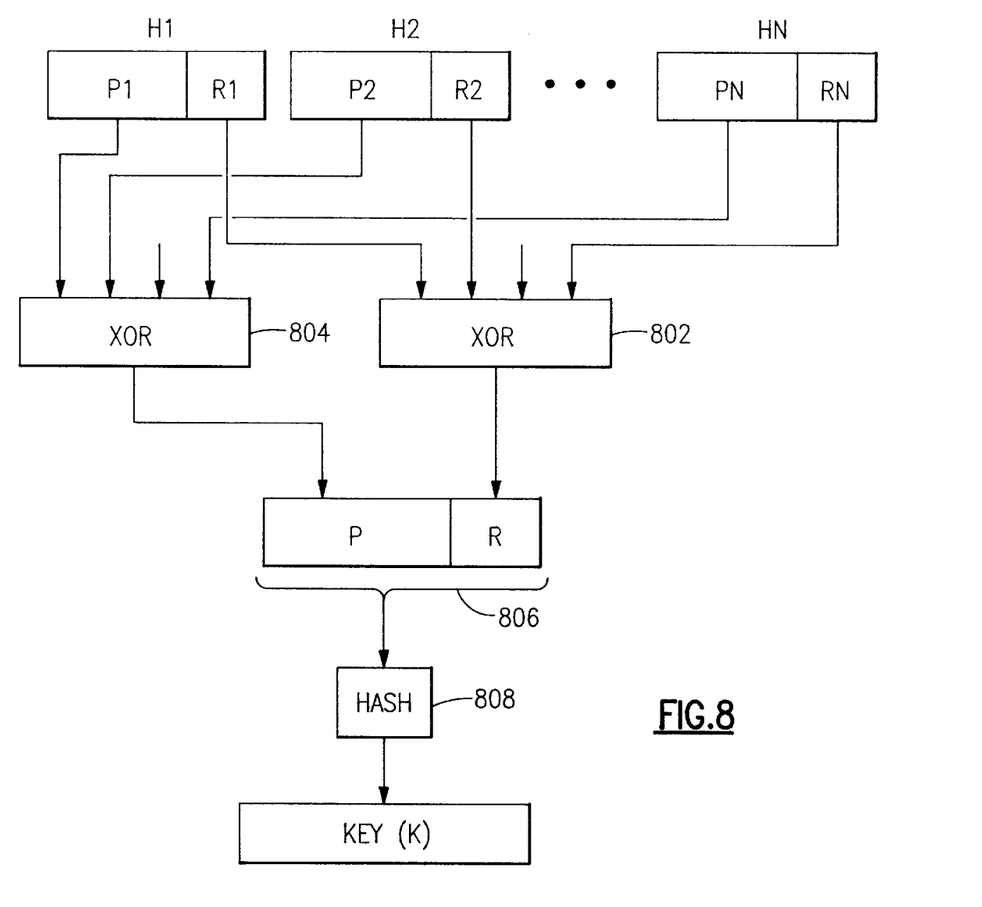
FIG. 8 shows a generalization of the procedure shown in FIG. 2A.

In the example shown in FIG. 2A, two (m+n)-bit quantities are generated to provide respective shared key portions (P and Q) to two key recovery agents in each country. However, the procedure could readily be adapted to provide more that two shared key values if there are more than two key recovery agents in each country. Referring to FIG. 8, if there are m bits in the shared key portions, n bits in the nonshared key portions, and N key recovery agents in each country, one could generate N (m+n)-bit values H1–HN, provide m bits (Pi) of each (m+n)-bit value Hi as a shared key portion to a different key recovery agent, and XOR (802) the remaining n bits (ri) of each (m+n)-bit value Hi to generate the nonshared key value R. The key (K) could be generated by XORing (804) the m-bit shared key portions Pi with one another and concatenating the result (P) with R to generate a value (806) which is hashed (808) one or more times to generate the key K.

Figure 2B:
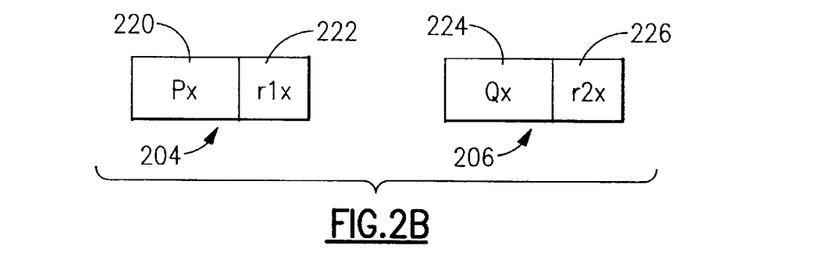
FIG. 2B is a schematic block diagram of one possible partitioning of the left and right halves of the SPQR value shown in FIG. 2A.
Figure 2C:
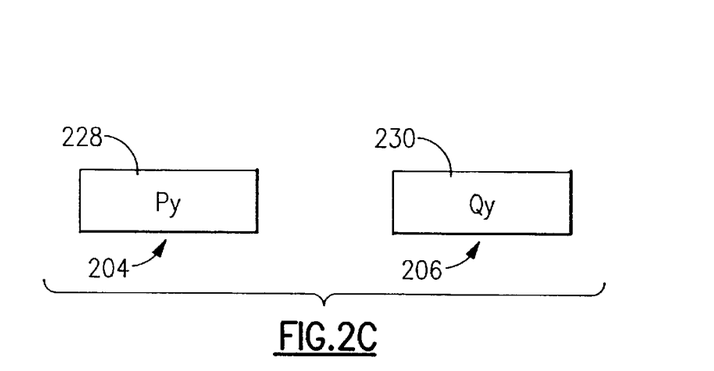
FIG. 2C is a schematic block diagram of another possible partitioning of the left and right halves of the SPQR value shown in FIG. 2A.

FIGS. 2B and 2C show an example of the partitioning of the SQPR value 202 on a per country basis. In this example Alice, located in country X, uses an R value 218 (=r1 XOR x2) of 56 bits (FIG. 2B). Alice accomplishes this by partitioning the left half 204 of SPQR 202 into a 112-bit Px part 220 and a 56-bit r1x part 220 and, similarly, partitioning the right SPQR half 206 into a 112-bit Qx part 220 and a 56-bit r2x part 220.

On the other hand Bob, located in country Y, uses an R value of 0 bits (FIG. 2C). Bob accomplishes this by partitioning (in a trivial sense) the left half 204 of SPQR 202 into a 168-bit Py part 228 and a zero-length r1y part (not shown) and, similarly, "partitioning" the right half 206 into a 168-bit Qy part 230 and a zero-length r2y part (not shown).

Alice's P and Q values Px (220) and Qx (224) are encrypted with the public keys of key recovery agents authorized by country X, while Bob's P and Q values Py (228) and Qy (230) are encrypted with the public keys of key recovery agents authorized by country Y. The encrypted P and Q values are "made available" to the key recovery agents by transmitting them with the encrypted data, as described below. In the example shown in FIGS. 2B–2C, Alice has a 56-bit R value (Rx) computed from r1x (222) and r2x (226), which she does not divulge to any third party. Bob has no comparable Ry value, since his values r1y and r2y are of zero length (i.e., null).

FIGS. 3A–3C and 4–6 illustrate the procedure for establishing a PQR value between Alice and Bob. In this example, Alice (the sender) in country X wishes to send an encrypted message to Bob (the recipient) in country Y, where country X and country Y require different sizes for R (the undivulged part of SPQR).

Figure 3A:
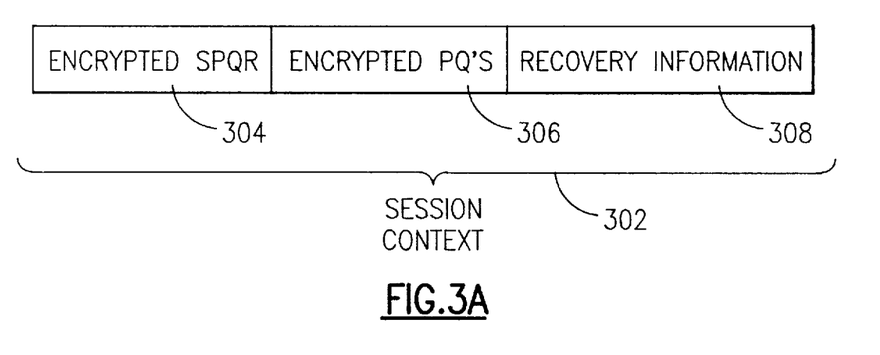
FIG. 3A is a schematic block diagram of the session context block transmitted to the intended receiver.
Figure 3B:
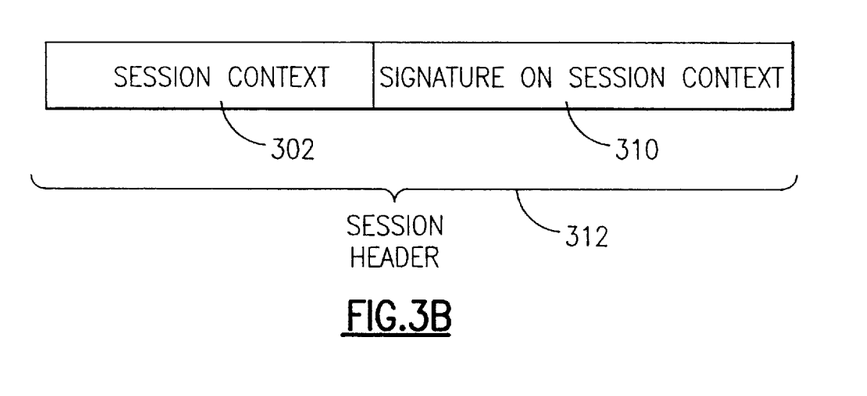
FIG. 3B is a schematic block diagram of the session header transmitted to the intended receiver.
Figure 3C:
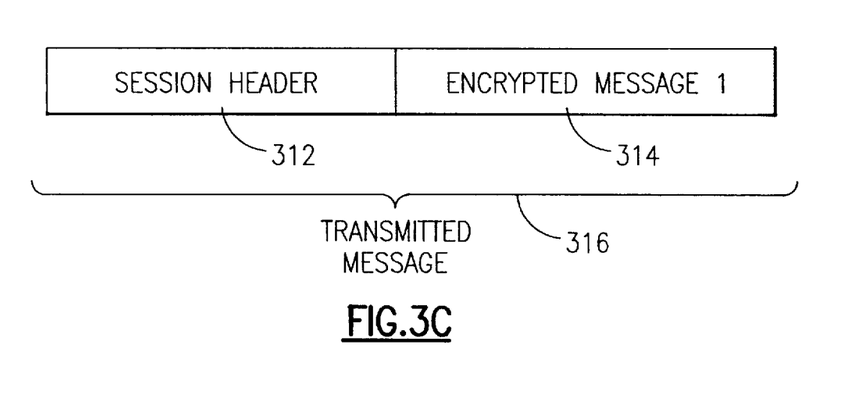
FIG. 3C is a schematic block diagram of the message packet transmitted to the intended receiver.

In brief, Alice's system creates a session header 312 (FIG. 3B–3C) containing protocol information, generates a cryptographic key K (118) from information stored in the session header, and encrypts a first message (message 1) with the key K to generate an encrypted message 1 (FIG. 3C). The session header 312 and the encrypted message 1 (314) are sent to Bob. Bob's system first performs consistency checking on the protocol information in the header 312. If the checking succeeds, Bob's system uses information in the session header 312 to regenerate the cryptographic key K. The key K is then used to decrypt the message 1 (314) received from Alice.

In the disclosed example, a session header 312 is appended to only the first message 314 of one or more messages making up a session. Alternatively, each message could have its own header 312 (in which case it would be a message header rather than a session header).

Figure 5:
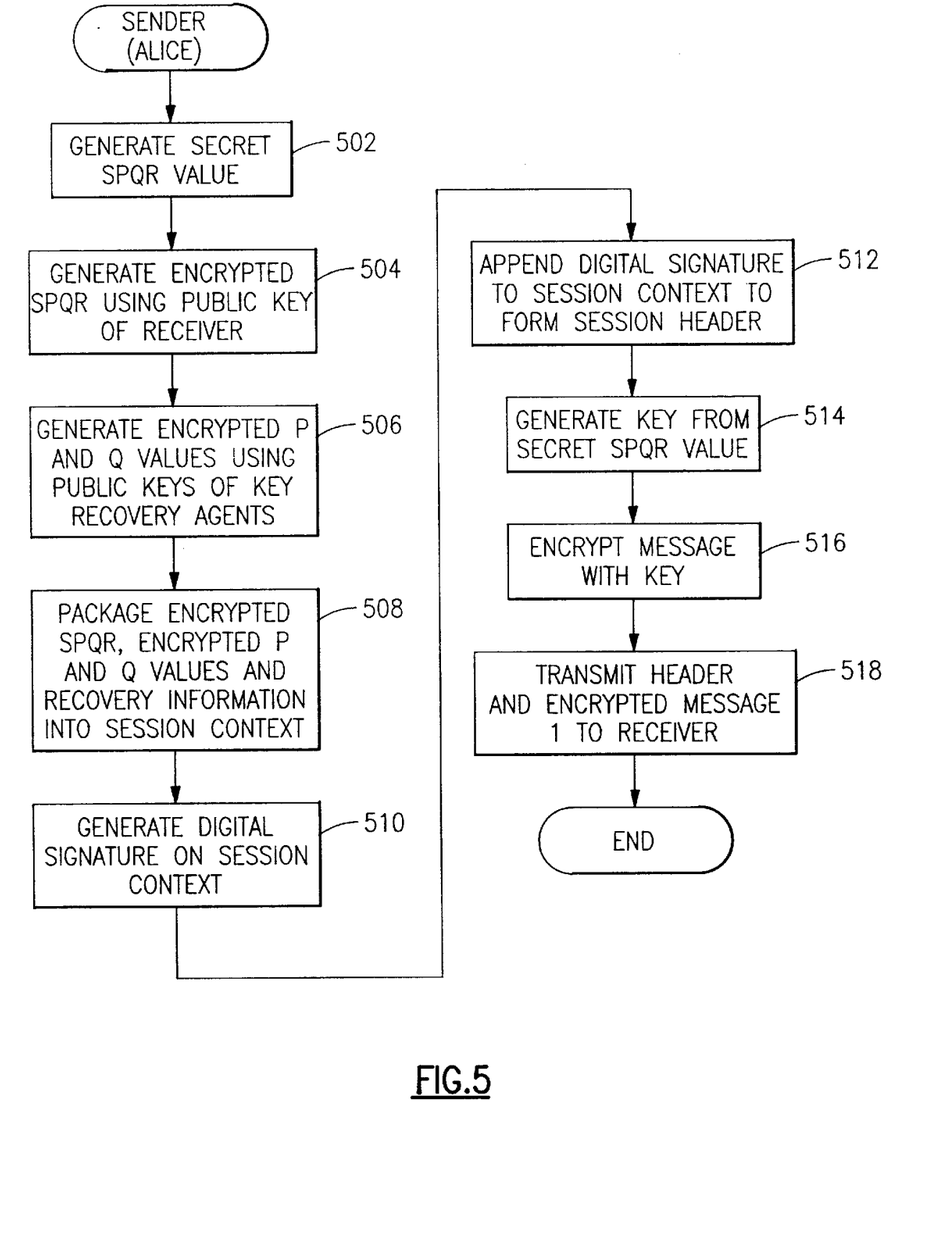
FIG. 5 is a flowchart of the steps performed by the sender to prepare a message packet for transmission to the intended receiver.

The procedure will be described in more detail. Referring to FIG. 5, Alice's system begins by generating a 336-bit secret starting PQR (SPQR) value 202 (FIG. 2A) (step 502). The SPQR value 202 is used by both Alice and Bob to generate a secret key K (118) using the procedure shown in FIG. 1; the key K is used to encrypt and decrypt messages. This is accomplished by exclusive-ORing the 168-bit left and 168-bit right halves of SPQR to form the intermediate value (P XOR Q) || R shown in FIG. 1. Thereafter, the key derivation process continues as described in FIG. 1.

Next, Alice encrypts the SPQR value 202 with a public key of Bob's that is specifically intended for key distribution to generate an encrypted SPQR value SPQR' (step 504). (It is assumed that each user employs one public and private key pair for key distribution and a different public and private key pair for signing.) The encrypted value SPQR', which is the logical equivalent of an encrypted key, is evaluated as:

SPQR'=ePUb(HASH(T1);SPQR; SALT0)

where PUb is the public key of the receiver (Bob); SPQR is the SPQR value 202 (FIG. 2A) generated in step 502; SALT0 is a 160-bit secret random value; HASH(T1) is a non-secret hash value (preferably, 128 or 160 bits); and T1 is non-secret recovery information to be described below.

SALT0 protects the encrypted SPQR value SPQR'. Even if a portion of the original SPQR value 202 becomes known, the remainder cannot be discovered via an exhaustive attack on the encrypted value SPQR'. SALT0 is also used as an input to a public one-way function ("one-way" being used here in the usual cryptographic sense) to generate four additional salt values (SALT1, SALT2, SALT3 and SALT4) used to encrypt the P and Q values in the manner described below. The one-way function ensures that it is easy to calculate SALT1-SALT4 from SALT0 but computationally infeasible to generate SALT0 from any of these derived salt values.

HASH(T1) is a hash value calculated on the recovery information Ti using a public one-way hash function. HASH (T1) provides a form of "reverse signature" for the information in T1. A reverse signature strongly couples information to a secret; while anyone can calculate a reverse signature, only users that know all the secrets inside the encrypted block (and can thereby recreate the encrypted block using the public key) or know the private key (and can thereby directly recover the secrets) can verify a reverse signature. Further information on reverse signatures may be found in D. B. Johnson and S. M. Matyas, "Enhanced Optimal Asymmetric Encryption: Reverse Signatures and ANSI X9.44", *Proceedings of the* 1996 *RSA Data Security Conference*, San Francisco, Calif., 1996, incorporated herein by reference.

Figure 5A:
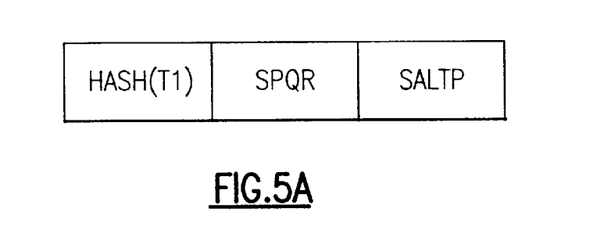
FIG. 5A shows the formatting of the SPQR block prior to encryption.

The values SPQR, SALT0 and HASH(T1) are formatted into a block (FIG. 5A), processed, and encrypted with Bob's public key. Preferably, this is done using the enhanced optimal asymmetric encryption procedure described in the above reference, although other procedures could be used as well.

Using the SPQR value 202 generated in step 502, Alice next derives the appropriate Px, Qx, Py, and Qy values 220, 224, 228 and 230 (FIGS. 2B–2C) for countries X and Y and encrypts these values with the public keys of authorized key recovery agents for countries X and Y, respectively, to generate encrypted P and Q values Px', Qx', Py' and Qy' (step 506).

The encrypted P and Q values are those parts of the secret SPQR value 202 that are "made available" to the key recovery agents. That is, they can be obtained from a key recovery agent with an authorized court order or other provided-for mechanism. The encrypted P and Q values are defined as follows:

Px'=ePUx1(HASH(T1);Px; SALT1)

Qx'=ePUx2(HASH(T1);Qx; SALT2)

Py'=ePUy1(HASH(T1);Py; SALT3)

Qy'=ePUy2(HASH(T1);Qy; SALT4;)

where:

PUx1 is the public key of key recovery agent 1 for country X;

PUx2 is the public key of key recovery agent 2 for country X;

PUy1 is the public key of key recovery agent 1 for country Y;

PUy2 is the public key of key recovery agent 2 for country Y;

Px and Qx are the P and Q values 220 and 224 (FIG. 2B) "made available" to authorized key recovery agents for country X;

Px and Qx are the P and Q values 220 and 224 (FIG. 2C) "made available" to authorized key recovery agents for country Y;

SALT1, SALT2, SALT3, SALT4 are 160-bit secret derived values generated as described for step 504;

HASH(T1) is a 128-bit or 160-bit non-secret hash value generated as described for step 504; and T1 is non-secret recovery information as described for step 504.

The salts SALT1-SALT4 protect the encrypted P and Q values. Even if a portion of P or Q should become known, the remainder could not be discovered via an exhaustive attack on the encrypted P or encrypted Q value. For example, consider the situation where Px and Qx are proper subsets of Py and Qy, respectively. Even if Px and Qx are obtained from key recovery agents via an authorized court order, the task of recovering R is not made simpler by first attacking Py and Qy (to recover a portion of R) and then attacking the remainder of R. The salt values SALT1-SALT4 are specifically constructed to be different to avoid the situation where two blocks of equal value are encrypted with different public keys.

The HASH(T1) present in the encrypted SPQR value is also included in the encrypted P and Q values. This provides a strong coupling of the recovery information T1 to the encrypted P or Q value, thereby providing the key recovery agents with a means for determining whether an encrypted P or Q value satisfies the stated conditions in a presented court order.

Figure 5B:
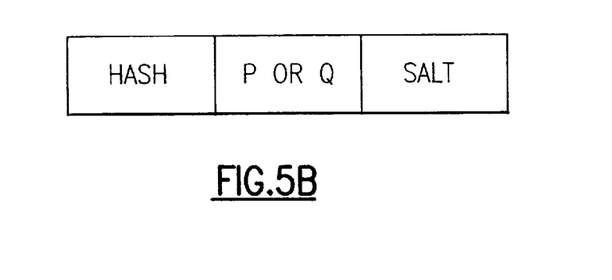
FIG. 5B shows the formatting of the P and Q blocks prior to encryption.

The P or Q value, the salt, and the HASH(T1) are formatted into a block (FIG. 5B), processed, and encrypted with the public key of the key recovery agent. Preferably, this is done using the enhanced optimal asymmetric encryption procedure described in the paper of D. B. Johnson et al. cited above, although other procedures could alternatively be used.

Following the encryption steps 504 and 506, Alice generates a session context block 302 (FIG. 3A) containing the encrypted value SPQR' (304), the encrypted P and Q values (306), and the recovery information T1 (308) (Step 508).

Alice then digitally signs the session context 302 with her private signature key to generate a signature 310 (FIG. 3B) (step 510). The signature 310 couples the transmitted quantities together and permits Bob to validate that the received encrypted SPQR value 304 originated with the claimed sender, Alice. The signature 310 is appended to the session context 302 to form a session header 312 (FIG. 3B) (step 512). (Alternatively, the signature could be omitted if repudiability were desired.)

Finally, a packet 316 containing the session header 312 and the encrypted message 1 (314) are sent to Bob (step 518).

Figure 6:
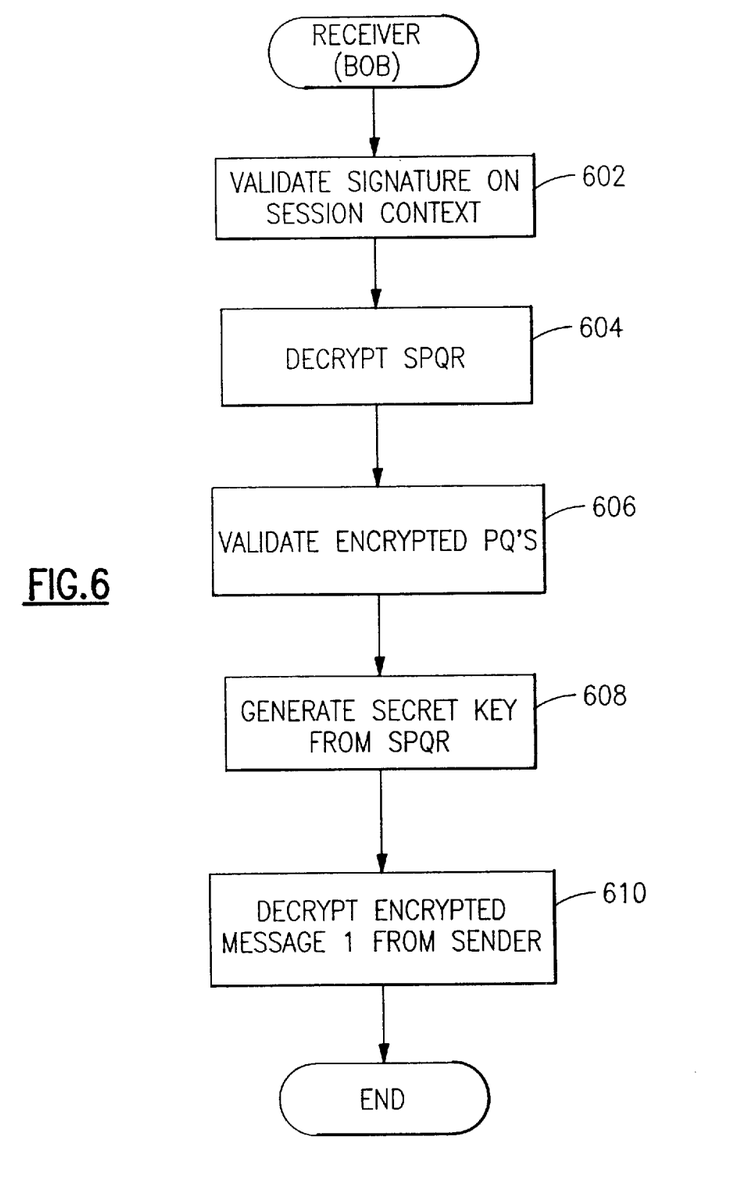
FIG. 6 is a flowchart of the steps performed by the intended receiver to process message packet received from the sender.

Referring now to FIG. 6, upon receiving the packet 316 (FIG. 3C) from Alice, Bob's system first validates the signature 310 on the session context 302, using Alice's public signature key (step 602).

Bob then decrypts the encrypted SPQR value 304 (FIG. 3A) using his private decryption key to obtain the original SPQR value 202 (FIG. 2A) (step 604).

Thereafter, Bob validates the received encrypted P and Q values 308 (step 606). This is done by reconstructing the values Px, Qx, Py, and Py from the decrypted SPQR value 202, encrypting these values with the public keys of the authorized key recovery agents for each country (X and Y), and comparing these produced values for equality with the encrypted P and Q values received from Alice.

Bob then regenerates the key 118 (FIG. 1) from the decrypted SPQR value 202 (FIG. 2A), using the procedure employed by Alice previously (step 608). This is done only after determining in step 606 that the correct encrypted P and Q values 304 have been received from Alice. Key 118 is provided to a requesting application program on Bob's system so that it can decrypt the encrypted message 1 (314) from Alice (step 610).

Recovery information Ti is provided (1) so that Bob can validate the encrypted SPQR value 304 and the encrypted P and Q values 306 for each key recovery agent and (2) so that the key recovery agents can validate their own respective encrypted P and Q values.

Figure 4:
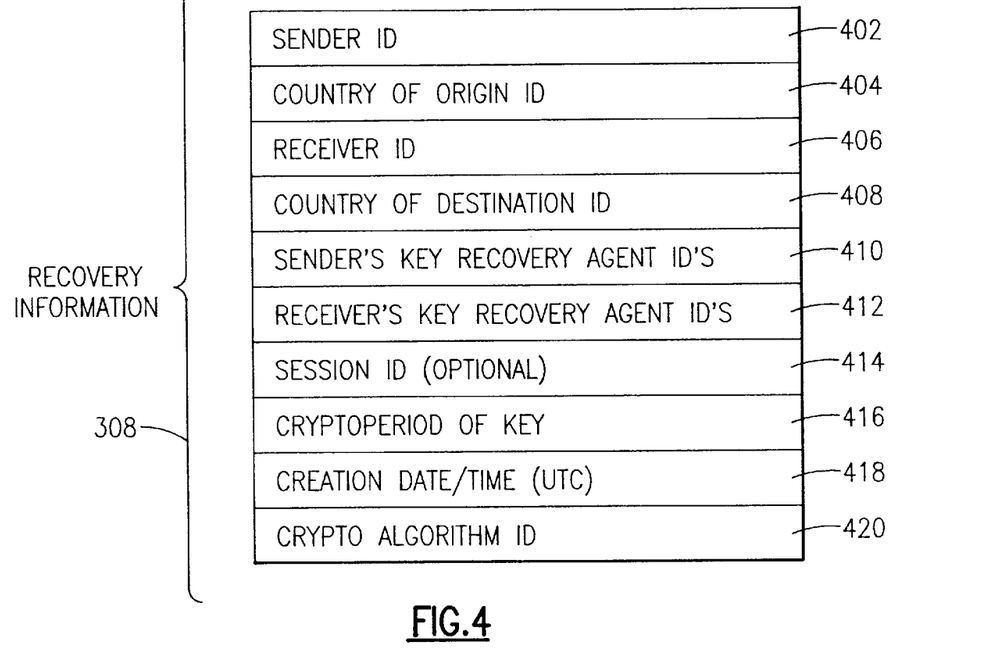
FIG. 4 is a schematic block diagram of the recovery information transmitted to the intended receiver in the session context block.

FIG. 4 shows the components of the recovery information T1. The sender ID 402 enables the receiver to obtain the public key certificate needed to validate the signature 310 generated by the sender on the session context 302.

The receiver ID 406 enables the receiver to determine that the message 314 is indeed intended for him or her.

The country-of-origin ID 404 and country-of-destination ID 408 permit the receiver to validate the contents of the session context 302 by reproducing equivalent encrypted P and Q values and comparing then for equality with the received encrypted P and Q values 306.

The sender's and receiver's key recovery agent IDs 410 and 412 permit the receiver to validate that bona fide key recovery agents have been used in accordance with the procedure of the present invention. They also permit the public key certificates for each of the key recovery agents to be obtained. The key recovery agent IDs 410 and 412 also enable law enforcement to know which key recovery agents are capable of decrypting a user's encrypted P and Q values 306. The default key recovery agent IDs 410 and 412 for each user may be carried in an extension to the X.509 version 3 certificate.

The (optional) unique session ID 414 permits the sender and receiver to identify the session.

The cryptoperiod 416 is specified by a starting and ending date and time for the use of the key. The P or Q value will not be released unless the period of the court order overlaps a portion of the cryptoperiod of the key. The key recovery system will enforce relatively short cryptoperiods (e.g., less than 1 day), and may be a policy decision of a country. This helps ensure that the session context 302 needs to be set up dynamically and therefore transmitted between the sender and receiver.

Creation date/time 418 denotes the date and time (UTC encoded) when the session context 302 was created. The receiver checks the date and time as part of consistency checking. The date and time must fall within the period of the court order in order to access the P or Q value.

The crypto algorithm ID 420 enables the procedure of the present invention to be parameterized. That is, the sizes of P, Q, and R can be made to depend on the cryptographic algorithm used for data encryption.

It is envisioned that the public key certificate for each user will adhere to the X.509 version 3 Certificate Standard. A v3 extension would desirably be capable of holding certain needed information about the PQR protocol, such as user ID, country ID, first key recovery agent ID and second key recovery agent ID. It is also envisioned that the sender's as well as the receiver's public key certificates must be made available to the PQR system. Thus, when the public keys of the users are made available for the purpose of effecting key distribution, the necessary information to perform key recovery will also become available, and can be validated. The certificate seems the natural place to carry this information. By incorporating a user's key recovery information in his/her public key certificate, there is less opportunity for a user to misuse the PQR system, e.g., by claiming a different country ID with more favorable key recovery options.

In a system where key distribution is performed using symmetric key cryptography (e.g., Kerberos), the same information could be stored and provided by a key distribution center (KDC). The KDC could also prepare the encrypted PQ values. A special version of Kerberos would be required in order to perform the consistency checking on the encrypted PQ values.

Figure 7:
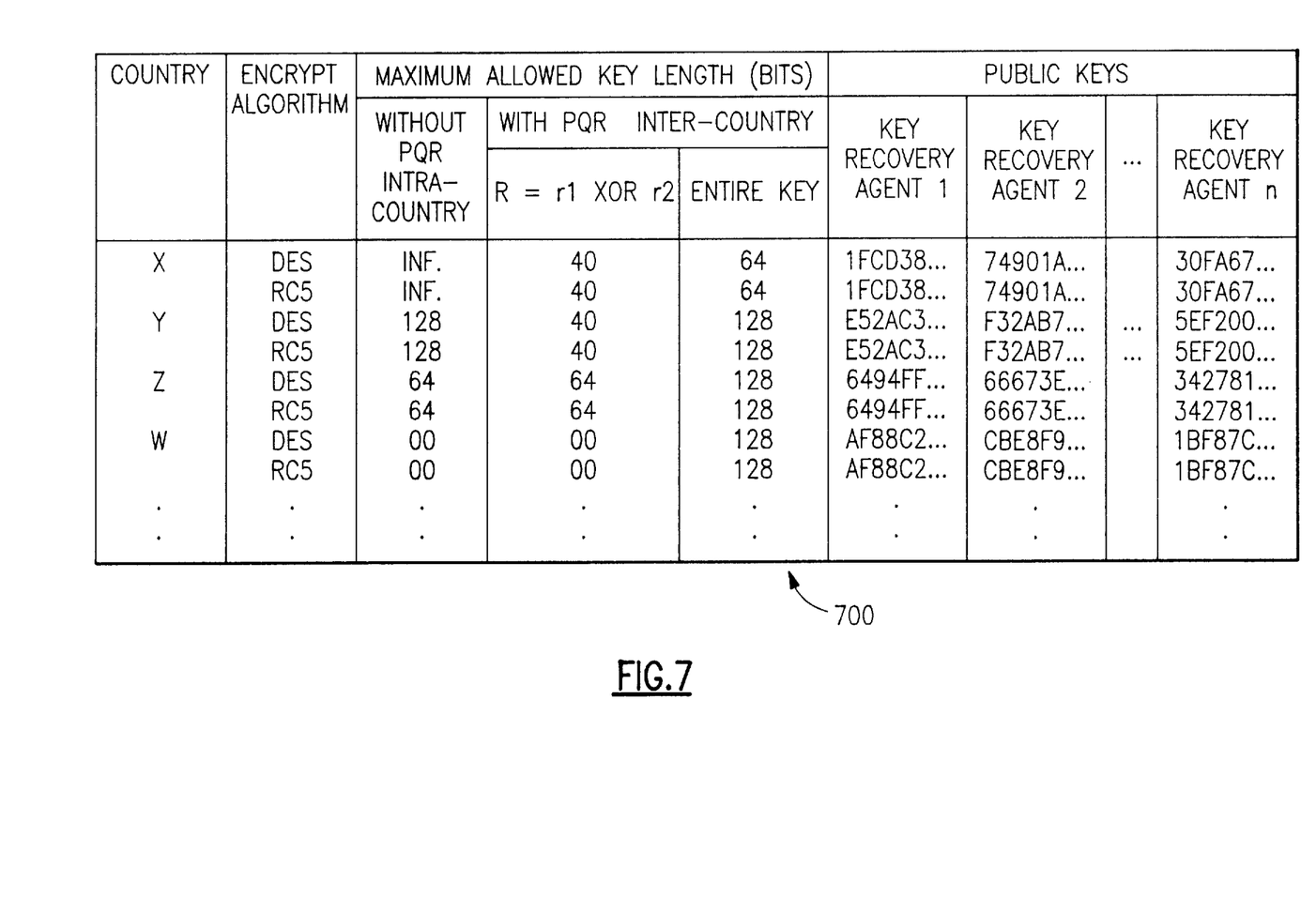
FIG. 7 shows the global communications table containing country-specific data used by the communicating parties.

The information required by the system of the present invention is stored in a table called the global communications table 700 (FIG. 7). The global communications table 700 contains information allowing the system to calculate the sizes of the keys and P, Q and R for specific algorithms and users located in different countries. It may also contain the public keys of key recovery agents authorized for each country. The numbers in the table are examples only to demonstrate the kind of flexibility the present invention permits. The variations are virtually unlimited. In particular, each country may have many key recovery agents.

For inter-country communications, the system of the present invention could determine Bob's country ID from his public key certificate or comparable system configuration information. Using Alice's origin country ID and Bob's destination country ID, the system will then calculate the maximum key length that Alice and Bob can use. This value is the smaller of the two key values. For example, for countries X and Y the key values for DES are 64 and 128 bits, respectively, in which case 64 is selected.

The lengths of Px, Qx, and Rx for Alice in country ID=X and Py, Qy, and Ry for Bob in country ID=Y are calculated. In this case, the PQR system will allow recovery of only as many bits as are required by the origin and destination countries. Therefore, the sizes of P, Q and R can vary depending on the country. However, the size and value of (Px XOR Qx) $\|$ Rx will always by equal the size and value of (Py XOR Qy) $\|$ Ry, thereby ensuring that the same key value will be calculated by Alice and Bob.

The present invention provides for interoperability between systems incorporating the invention and systems omitting the invention PQR, subject to export/import regulations of the relevant countries. A non-PQR system could not act as a sender and communicate with a PQR system unless both countries had no requirement for key recovery. This is so because the receiving PQR system would expect to see encrypted P and Q values in the session context which it would be required to validate. A PQR system could not act as a sender and communicate with a non-PQR system unless there was a way for the sender to determine a set of default key recovery information for the receiver. If the sender could determine the country ID for the receiver and if the PQR scheme provides the IDs of two default key recovery agents for each country, then a PQR systems might be able to act as a sender and communicate with a non-PQR system acting as the receiver. But the receiver would still need to use the same key derivation algorithm using a received PQR value in the session context.

The random-appearing salts SALT1-SALT4 used in the encrypted SPQR and the encrypted Px, Qx, Py, and Qy values must be generated in a way which allows Bob to verify that they are correct. As Bob does not know the private keys belonging to the key recovery agents, the only way to do this is to encrypt the plaintext values with the public keys of the key recovery agents and compare them for equality with the received values.

This means that the salts in the encrypted Px, Qx, Py, and Qy values must be derivable from the salt in the encrypted SPQR. One way to do this is to prefix a count field to SALT0 and hash the result with a one-way hash function to produce a pseudorandom salts (SALT1, SALT2, SALT3, and SALT4) for the encrypted Px, Qx, Py, and Qy values, respectively. The count would contain a numerical value representing the order of the encrypted P or Q value in the session context. Doing it this way ensures that all derived salt values in the encrypted Px, Qx, Py, and Qy values appear independent; a corrupt key recovery agent cannot use a derived salt value to reduce the security of another encrypted P or Q value. In addition to supplying an authorized requester with a P or Q value, the key recovery agent can also supply the derived salt used so that the authorized requester can use the key recovery public key to verify that the correct decryption was done by the key recovery agent.

An authorized requester accesses the session context. The means to do this are not specified in the PQR framework. Both the authorized requester and the key recovery agent can have some level of confidence that the session context conforms to the PQR framework, by verifying the digital signature on the session context. Note that this verification may be done at any time by anyone and as often as desired, as only non-secret values are input to the signature process.

Both the authorized requester and the key recovery agent can verify that the user ID(s) and date/time values are valid, that is, are specified in the authorization to process the key recovery request. The other public information can also be validated as appropriate.

To get legitimate access to information encrypted under the present invention, it is contemplated that a law enforcement agency first obtain a warrant or court order to conduct wire-tapping against a specified target for a specified period of time. Next, the law enforcement agency must intercept the communications to collect the encrypted data. The law enforcement agency next brings the encrypted P and Q values to the key recovery agents, together with the court order. The key recovery agents privately decrypt the P and Q values and check the IDs and dates against the court order. If all requirements of the court order have been met, the agents then release the decrypted P and Q values to the law enforcement agency. The law enforcement agency then XORs the P and Q values together, performs an exhaustive search on R to derive the full key, and decrypts the information using the derived key. The requirement for an exhaustive search on R deals with the potential problem that the key recovery agents could be colluding with the law enforcement agency to conduct widespread key recovery. The exhaustive search requirement is designed to make such widespread abuse too expensive to carry out.

Several types of attacks may be considered when evaluating the present invention. One type of attack is based on corrupt key recovery agents. If one of the key recovery agents was corrupt and revealed its P value, it would not pose a problem, since the Q value is still unknown to the attacker. Not knowing the value of Q or the value of R, the attacker would still be required to break a 168-bit intermediate value (P XOR Q concatenated with R). Users should find this solution more palatable than a scheme where the entire key is recovered by the key recovery agents. As long as the key recovery agents do not collude, no attack is possible.

A corrupt key recovery agent is prevented from using the salt value associated with his encrypted P or Q to attempt to analyze another encrypted P or Q. Each salt appears independent since it was derived by passing the PQR salt through a one-way function.

Another type of attack is based on corrupt users. A basic assumption of the present invention is that if both users are corrupt, they can use their own encryption methods or bypass any software system checks. Therefore, the present invention does not seek to thwart an attack where both users are corrupt. This is a fundamental simplifying assumption.

If the sender is corrupt and does not send the key recovery values, the receiver will not be able to validate them. By detecting a corrupt transmission, the decryption process will not be enabled.

If the receiver is corrupt and does not verify the key recovery values, the sender has still transmitted them, allowing them to be accessed by key recovery agents as needed.

If a very long cryptoperiod is allowed, a pair of users can send the session context over a secure channel (for example, by meeting face to face) and then use this session context for a long time. This might pose a problem for accessing the session context. One solution is to require dynamic session contexts be used by specifying a limited cryptoperiod.

It is assumed that a public key infrastructure exists which is capable of providing certificates of public keys and for certificate management at the client devices. It is also assumed that each party can determine the country it is located in. This is important for the mobile users.

The present invention gives an individual a degree of data privacy that is very resistant to a key exhaustion attack by a non-authorized entity. Even for an authorized recovery, the remaining workfactor is nontrivial. Thus, a law enforcement agency can monitor (via key recovery) selected individuals, but mass monitoring is much more impractical. At the same time, the present invention addresses a law enforcement agency's need to monitor criminal activities, since a suspected criminal may be targeted and his or her encrypted messages recovered to help determine information.

Providing key recovery at the session level has several advantages. First, it is compartmentalized. There is a natural limitation of the key in time which hopefully corresponds closely with the time period of an authorized key recovery. Second, it is appropriate. Opening a private decryption key of a receiver to get messages from a suspected bad sender is inappropriate. Anyone can send a message to high-ranking officials. This does not mean that these officials should have their keys opened.

What is claimed is:

1. A method of generating a cryptographic key for use by a pair of communicating parties while providing for the recovery of said key using a plurality of cooperating key recovery agents, said method comprising the steps of:

generating a plurality of shared key parts that are shared with respective key recovery agents;

generating a nonshared key part that is not shared with any key recovery agent;

generating said key as a function of said shared key parts and said nonshared key part; and making respective ones of said shared key parts available to said key recovery agents to facilitate said recovery of said key using said key recovery agents.

2. The method of claim 1 in which said step of generating said key comprises the step of:

combining said shared key parts to generate a composite key part; and generating said key as a function of said composite key part and said nonshared key part.

3. The method of claim 2 in which said shared key parts and said composite key part have a common length.

4. The method of claim 2 in which said shared key parts are combined by modulo 2 addition.

5. The method of claim 1 in which each of said key recovery agents has a public encryption key and a corresponding private decryption key, said step of making respective ones of said shared key parts available to said key recovery agents comprising the steps of:

encrypting said shared key parts using the public encryption keys of said key recovery agents to generate a plurality of encrypted shared key parts; and transmitting said encrypted shared key parts over a communications channel from which said encrypted shared key parts may be provided to said key recovery agents.

6. The method of claim 1 in which said step of generating said key comprises the step of:

combining said shared key parts to generate a composite key part;

concatenating said composite key part with said nonshared key part to generate a resultant value; and generating said key as a function of said resultant value.

7. Apparatus for generating a cryptographic key for use by a pair of communicating parties while providing for the recovery of said key using a plurality of cooperating key recovery agents, said apparatus comprising:

means for generating a plurality of shared key parts that are shared with respective key recovery agents;

means for generating a nonshared key part that is not shared with any key recovery agent;

means for generating said key as a function of said shared key parts and said nonshared key part; and means for making respective ones of said shared key parts available to said key recovery agents to facilitate said recovery of said key using said key recovery agents.

8. The apparatus of claim 7 in which means for generating said key comprises:

means for combining said shared key parts to generate a composite key part; and means for generating said key as a function of said composite key part and said nonshared key part.

9. The apparatus of claim 8 in which said shared key parts and said composite key part have a common length.

10. The apparatus of claim 8 in which said shared key parts are combined by modulo 2 addition.

11. The apparatus of claim 7 in which each of said key recovery agents has a public encryption key and a corresponding private decryption key, said step of making respective ones of said shared key parts available to said key recovery agents comprising the steps of:

encrypting said shared key parts using the public encryption keys of said key recovery agents to generate a plurality of encrypted shared key parts; and transmitting said encrypted shared key parts over a communications channel from which said encrypted shared key parts may be provided to said key recovery agents.

12. The apparatus of claim 7 in which said means for generating said key comprises:

means for combining said shared key parts to generate a composite key part;

means for concatenating said composite key part with said nonshared key part to generate a resultant value; and means for generating said key as a function of said resultant value.

13. A program storage device readable by a machine, tangibly embodying a program of instructions executable by the machine to perform method steps for generating a cryptographic key for use by a pair of communicating parties while providing for the recovery of said key using a plurality of cooperating key recovery agents, said method steps comprising:

generating a plurality of shared key parts that are shared with respective key recovery agents;

generating a nonshared key part that is not shared with any key recovery agent;

generating said key as a function of said shared key parts and said nonshared key part; and making respective ones of said shared key parts available to said key recovery agents to facilitate said recovery of said key using said key recovery agents.

14. The program storage device of claim 13 in which said step of generating said key comprises the step of:

combining said shared key parts to generate a composite key part; and generating said key as a function of said composite key part and said nonshared key part.

15. The program storage device of claim 14 in which said shared key parts and said composite key part have a common length.

16. The program storage device of claim 14 in which said shared key parts are combined by modulo 2 addition.

17. The program storage device of claim 13 in which each of said key recovery agents has a public encryption key and a corresponding private decryption key, said step of making respective ones of said shared key parts available to said key recovery agents comprising the steps of:

encrypting said shared key parts using the public encryption keys of said key recovery agents to generate a plurality of encrypted shared key parts; and transmitting said encrypted shared key parts over a communications channel from which said encrypted shared key parts may be provided to said key recovery agents.

18. The program storage device of claim 13 in which said step of generating said key comprises the step of:

combining said shared key parts to generate a composite key part;

concatenating said composite key part with said nonshared key part to generate a resultant value; and generating said key as a function of said resultant value.

19. The method of claim 1 in which a plurality of sets of key recovery agents are provided, each key recovery agent in a particular one of said sets cooperating with the other key recovery agents in said set to recover said key.

20. The method of claim 19 in which said step of generating said shared key parts is performed for each of said sets of key recovery agents.

21. The method of claim 20 in which said step of generating said shared key parts comprises the steps of:

generating a plurality of key parts that may be combined with one another to generate said key, said key parts corresponding in number to the number of key recovery agents in one of said sets; and extracting from each of said key parts, for each of said sets of key recovery agents, a shared key part that is shared with one of the key recovery agents in said set.

22. The method of claim 21 in which said extracting step comprises, for at least one of said sets of key recovery agents, the step of:

partitioning each of said key parts into a shared key part that is shared with one of the key recovery agents in said set and a nonshared key part that is not shared with any key recovery agent in said set.

23. A method of providing for the recovery of a cryptographic key using a set of key recovery agents selected from a plurality of sets of key recovery agents, each key recovery agent in a particular one of said sets cooperating with the other key recovery agents in said set to recover said key, said method comprising the steps of:

generating a plurality of sets of key recovery values, each of said sets of key recovery values corresponding to one of said sets of key recovery agents, each key recovery value in one of said sets corresponding to a key recovery agent in that set, each of said sets of key recovery values having the property that said cryptographic key is recoverable from the key recovery values in said set without requiring the key recovery values in any other of said sets; and making the respective key recovery values of each of said sets of key recovery values available to the corresponding key recovery agents in that set to facilitate the recovery of said key using a selected one of said sets of key recovery agents and without requiring the cooperation the key recovery agents of any other of said sets.

24. The method of claim 23 in which each of said key recovery agents has a public encryption key and a corresponding private decryption key, said step of making of said key recovery values available to said key recovery agents comprising the steps of:

encrypting said key recovery values using the public encryption keys of said key recovery agents to generate a plurality of encrypted key recovery values; and transmitting said encrypted key recovery values over a communications channel from which said encrypted key recovery values may be provided to said key recovery agents.

25. The method of claim 24 in which said encrypted key recovery values are transmitted over said communications channel along with a message encrypted under said key.

26. Apparatus for providing for the recovery of a cryptographic key using a set of key recovery agents selected from a plurality of sets of key recovery agents, each key recovery agent in a particular one of said sets cooperating with the other key recovery agents in said set to recover said key, said apparatus comprising:

means for generating a plurality of sets of key recovery values, each of said sets of key recovery values corresponding to one of said sets of key recovery agents, each key recovery value in one of said sets corresponding to a key recovery agent in that set, each of said sets of key recovery values having the property that said cryptographic key is recoverable from the key recovery values in said set without requiring the key recovery values in any other of said sets; and means for making the respective key recovery values of each of said sets of key recovery values available to the corresponding key recovery agents in that set to facilitate the recovery of said key using a selected one of said sets of key recovery agents and without requiring the cooperation the key recovery agents of any other of said sets.

27. A program storage device readable by a machine, tangibly embodying a program of instructions executable by the machine to perform method steps for providing for the recovery of a cryptographic key using a set of key recovery agents selected from a plurality of sets of key recovery agents, each key recovery agent in a particular one of said sets cooperating with the other key recovery agents in said set to recover said key, said method steps comprising:

generating a plurality of sets of key recovery values, each of said sets of key recovery values corresponding to one of said sets of key recovery agents, each key recovery value in one of said sets corresponding to a key recovery agent in that set, each of said sets of key recovery values having the property that said cryptographic key is recoverable from the key recovery values in said set without requiring the key recovery values in any other of said sets; and making the respective key recovery values of each of said sets of key recovery values available to the corresponding key recovery agents in that set to facilitate the recovery of said key using a selected one of said sets of key recovery agents and without requiring the cooperation the key recovery agents of any other of said sets.

* * * * *